(12) United States Patent
Kandori et al.

(10) Patent No.: US 10,084,394 B2
(45) Date of Patent: Sep. 25, 2018

(54) CONTROL APPARATUS FOR CAPACITIVE ELECTROMECHANICAL TRANSDUCER, AND METHOD OF CONTROLLING THE CAPACITIVE ELECTROMECHANICAL TRANSDUCER

(71) Applicant: CANON KABUSHIKI KAISHA, Tokyo (JP)

(72) Inventors: Atsushi Kandori, Ebina (JP); Makoto Takagi, Yokohama (JP); Masao Majima, Isehara (JP); Kenichi Nagae, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 369 days.

(21) Appl. No.: 14/956,316

(22) Filed: Dec. 1, 2015

(65) Prior Publication Data

US 2016/0087551 A1     Mar. 24, 2016

Related U.S. Application Data

(62) Division of application No. 13/500,284, filed as application No. PCT/JP2010/006717 on Nov. 16, 2010, now Pat. No. 9,238,250.

(30) Foreign Application Priority Data

Dec. 11, 2009     (JP) ................................. 2009-282278

(51) Int. Cl.
*B06B 1/00*     (2006.01)
*H02N 1/00*     (2006.01)
(Continued)

(52) U.S. Cl.
CPC ........... *H02N 1/006* (2013.01); *B06B 1/0246* (2013.01); *B06B 1/0292* (2013.01); *G01S 3/8083* (2013.01)

(58) Field of Classification Search
USPC ........................................................ 367/181
See application file for complete search history.

(56) References Cited

U.S. PATENT DOCUMENTS

| 5,144,466 A | 9/1992 | Nakamura et al. |
| 5,343,314 A | 8/1994 | Nakamura et al. |

(Continued)

FOREIGN PATENT DOCUMENTS

| CN | 1767192 A | 5/2006 |
| CN | 1849746 A | 10/2006 |

(Continued)

OTHER PUBLICATIONS

U.S. Appl. No. 13/508,344 filed by Kandori et al. on May 4, 2012.

(Continued)

*Primary Examiner* — James R Hulka
(74) *Attorney, Agent, or Firm* — Fitzpatrick, Cella, Harper & Scinto

(57) ABSTRACT

Provided is a control apparatus and control method for a capacitive electromechanical transducer with small decrease in transmission/reception efficiency, and with sets of transmission/reception characteristics with different frequency ranges. The apparatus has cells each including first and second electrodes facing each other via a gap; includes a driving/detecting unit and an external stress applying unit. The driving/detecting unit performs at least one of causing the second electrode to vibrate and transmit elastic waves by generating an AC electrostatic attractive force between the electrodes, and detecting a change of capacitance between the electrodes, the change being caused by the second electrode vibrating upon receipt of elastic waves. The external stress applying unit changes the external stress applied to the second electrode. The driving/detecting unit adjusts frequency characteristics by changing a parameter defining (Continued)

the frequency domain used in a transmitting/receiving operation, corresponding to the change of the external stress.

24 Claims, 5 Drawing Sheets

(51) Int. Cl.
 *B06B 1/02* (2006.01)
 *G01S 3/808* (2006.01)

(56) References Cited

U.S. PATENT DOCUMENTS

| | | | |
|---|---|---|---|
| 5,396,360 A | 3/1995 | Majima | |
| 5,586,131 A | 12/1996 | Ono et al. | |
| 5,659,560 A | 8/1997 | Ouchi et al. | |
| 5,801,861 A | 9/1998 | Majima | |
| 5,945,768 A | 8/1999 | Treu, Jr. | |
| 5,998,924 A | 12/1999 | Yamamoto et al. | |
| 6,632,178 B1 | 10/2003 | Fraser | |
| 6,759,888 B1 | 7/2004 | Wodnicki | |
| 7,149,442 B2 | 12/2006 | Ushijima et al. | |
| 7,274,623 B2 | 9/2007 | Bayram et al. | |
| 7,382,137 B2 | 6/2008 | Ushijima et al. | |
| 7,564,172 B1* | 7/2009 | Huang | B06B 1/0292 310/311 |
| 7,741,851 B2 | 6/2010 | Ushijima et al. | |
| 7,883,446 B2 | 2/2011 | Adachi et al. | |
| 8,176,780 B2 | 5/2012 | Takagi et al. | |
| 8,559,274 B2 | 10/2013 | Huang | |
| 2004/0160144 A1 | 8/2004 | Daft et al. | |
| 2004/0217671 A1* | 11/2004 | Rosenthal | A61M 5/142 310/328 |
| 2005/0096546 A1 | 5/2005 | Hazard et al. | |
| 2005/0124884 A1 | 6/2005 | Bolorforosh et al. | |
| 2005/0200241 A1 | 9/2005 | Degertekin | |
| 2005/0234342 A1* | 10/2005 | Bayram | B06B 1/0292 600/459 |
| 2006/0004289 A1 | 1/2006 | Tian et al. | |
| 2006/0181712 A1 | 8/2006 | Degertekin et al. | |
| 2007/0228877 A1 | 10/2007 | Huang | |
| 2007/0228878 A1 | 10/2007 | Huang | |
| 2007/0232924 A1 | 10/2007 | Karasawa | |
| 2007/0287918 A1 | 12/2007 | Huang | |
| 2008/0194053 A1 | 8/2008 | Huang | |
| 2008/0197751 A1 | 8/2008 | Huang | |
| 2008/0203556 A1 | 8/2008 | Huang | |
| 2008/0264167 A1 | 10/2008 | Kandori et al. | |
| 2008/0290756 A1 | 11/2008 | Huang | |
| 2009/0140606 A1 | 6/2009 | Huang | |
| 2009/0149751 A1 | 6/2009 | Mourad et al. | |
| 2009/0152980 A1 | 6/2009 | Huang | |
| 2009/0167107 A1* | 7/2009 | Huang | B06B 1/0292 310/300 |
| 2009/0193893 A1 | 8/2009 | Kandori et al. | |
| 2009/0198307 A1* | 8/2009 | Mi | A61B 5/0031 607/60 |
| 2009/0205423 A1 | 8/2009 | Takagi et al. | |
| 2010/0213791 A1 | 8/2010 | Kandori et al. | |
| 2010/0254222 A1 | 10/2010 | Huang | |
| 2010/0312119 A1 | 12/2010 | Hashiba et al. | |
| 2011/0031568 A1 | 2/2011 | Kandori et al. | |
| 2011/0169510 A1 | 7/2011 | Kandori et al. | |
| 2011/0187868 A1 | 8/2011 | Chang et al. | |
| 2012/0103096 A1 | 5/2012 | Kandori | |

FOREIGN PATENT DOCUMENTS

| | | |
|---|---|---|
| CN | 1886006 A | 12/2006 |
| EP | 1 835 322 A1 | 9/2007 |
| JP | H11-153665 A | 6/1999 |
| JP | 2006-020313 A | 1/2006 |
| JP | 2007-244415 A | 9/2007 |
| JP | 2011-522444 A | 7/2011 |
| WO | 2005-120359 A1 | 12/2005 |
| WO | 2007/015219 A2 | 2/2007 |
| WO | 2009-016606 A2 | 2/2009 |
| WO | 2009-069281 A1 | 6/2009 |
| WO | 2009-073562 A1 | 6/2009 |
| WO | 2009-073562 A1 | 6/2009 |

OTHER PUBLICATIONS

Eames, et al., "Selectable Frequency CMUT With Membrane Stand-Off Structures", 2009 IEEE International Ultrasonics Symposium Proceedings, 2009, pp. 2814 to 2817.

International Preliminary Report on Patentability and Written Opinion dated Jun. 21, 2012 in PCT/JP2010/006717.

Peng, Jun, Fundamental and Application of Optoelectronic Device, Jun. 30, 2009.

Chinese Office Action dated Jan. 26, 2017 in Chinese Application No. 201510504147.9.

* cited by examiner

CONTROL APPARATUS FOR CAPACITIVE ELECTROMECHANICAL TRANSDUCER, AND METHOD OF CONTROLLING THE CAPACITIVE ELECTROMECHANICAL TRANSDUCER

This application is a divisional of U.S. patent application Ser. No. 13/500,284, filed Apr. 12, 2012, which was a National Stage of International Application No. PCT/JP2010/006717, filed Nov. 16, 2010. The contents of each of the foregoing applications are incorporated by reference herein.

TECHNICAL FIELD

The present invention relates to a control apparatus for an electromechanical transducer such as an ultrasound probe that performs transmission/reception (in this specification, transmission/reception means at least one of transmission and reception) of elastic waves such as ultrasound, and also relates to a method of controlling the electromechanical transducer.

BACKGROUND ART

As a transducer that performs transmission/reception of ultrasound, a CMUT (Capacitive Micromachined Ultrasonic Transducer), that is a capacitive ultrasound transducer manufactured by a MEMS (Micro Electro Mechanical Systems) process to which a semiconductor process is applied, has been proposed. There has been a measurement method by which ultrasound is transmitted to a measuring object, and the ultrasound reflected by the measuring object is received to obtain the information about the measuring object, with the use of an ultrasound transducer. There has been a suggested method by which the transmission/reception transducer used in the above measurement method is a CMUT that characteristically has a relatively wide frequency range (wideband) of ultrasound to be transmitted/received.

It is known that a CMUT has two modes in which the condition of a diaphragm that vibrates upon receipt of ultrasound varies: a conventional mode and a collapse mode (see PTL 1). In the conventional mode, the diaphragm is not in contact with a lower electrode during a transmitting/receiving operation, even if the diaphragm is concaved. In the collapse mode, on the other hand, the diaphragm is brought into contact with a lower electrode when concaved during a transmitting/receiving operation. PTL 1 discloses that ultrasound with large amplitude can be emitted by causing a diaphragm to vibrate between the conventional mode and the collapse mode.

According to a method of measuring ultrasound through transmission and reception, the required frequency range varies with measuring objects. Examples of typical features include a feature centering around 5 MHz (about 1 MHz through 5 MHz, for example) and a feature centering around 10 MHz (about 7 MHz through 12 MHz, for example). As an example of the former feature, there is a method of receiving ultrasound generated from a measuring object after light emission. This is also called photoacoustic tomography (PAT). As an example of the latter feature, there is a method of receiving ultrasound reflected by a measuring object after ultrasound transmission. As such, the frequency range required for a capacitive transducer varies depending on the size of the measuring object, the depth of the measurement, or the measurement method.

CITATION LIST

Patent Literature

PTL 1: U.S. Pat. No. 7,274,623

SUMMARY OF INVENTION

Technical Problem

It is difficult to perform transmission/reception at the two frequencies of 5 MHz and 10 MHz with a single CMUT, even if the CMUT has wideband characteristics to satisfy the above demand. If a transducer is designed to include CMUTs with different frequency characteristics from each other so as to transmit/receive ultrasound at different frequencies, the area to be used for transmission/reception in each CMUT becomes smaller, and the ultrasound transmission/reception efficiency of the transducer becomes poorer. PTL 1 does not disclose a method for satisfying such a demand.

Solution to Problem

In view of the above problems, a control apparatus for a capacitive electromechanical transducer according to the present invention has the following features. That is, the control apparatus for a capacitive electromechanical transducer that has cells each including first and second electrodes that face each other, with a gap being interposed in between, includes a driving/detecting unit and an external stress applying unit. The driving/detecting unit performs at least one of a driving operation to cause the second electrode to vibrate and transmit elastic waves by generating an AC electrostatic attractive force between the first and second electrodes, and a detecting operation to detect a change of capacitance between the first and second electrodes, the change of capacitance being caused by the second electrode vibrating upon receipt of elastic waves. The external stress applying unit changes the external stress to be applied to the second electrode. Further, the driving/detecting unit adjusts frequency characteristics by changing a parameter that defines the frequency domain to be used in a transmitting/receiving operation, corresponding to the change of the external stress.

Also, in view of the above problems, a method of controlling a capacitive electromechanical transducer according to the present invention has the following features. That is, the method of controlling a capacitive electromechanical transducer that has cells each including first and second electrodes that face each other, with a gap being interposed in between, includes first through third steps. In the first step, at least one of the following two operations is performed: a driving operation to cause the second electrode to vibrate and transmit elastic waves by generating an AC electrostatic attractive force between the first and second electrodes, and a detecting operation to detect a change of capacitance between the first and second electrodes, the change of capacitance being caused by the second electrode vibrating upon receipt of elastic waves. In the second step, the external stress to be applied to the second electrode is changed, so as to change the frequency characteristics to which the second electrode responds. In the third step, the frequency characteristics are adjusted by changing a parameter that defines the frequency domain to be used in a transmitting/receiving operation, corresponding to the change of the external stress. In this manner, the frequency characteristics in operations to transmit/receive elastic waves in the capacitive electromechanical transducer, or the transmission/reception bands, are changed.

Advantageous Effects of Invention

According to the control apparatus and control method for an electromechanical transducer of the present invention, the frequency characteristics are adjusted by changing a parameter that defines the frequency domain to be used in transmitting/receiving operations, corresponding to a change in the frequency characteristics to which the second electrode responds. Accordingly, a single electromechanical transducer can have sets of transmission/reception characteristics with different frequency ranges between the cutoff frequency on the low frequency side and the cutoff frequency on the high frequency side that can be used, or frequency characteristics in an input-output relationship, for example.

DESCRIPTION OF EMBODIMENTS

Figure 1A:
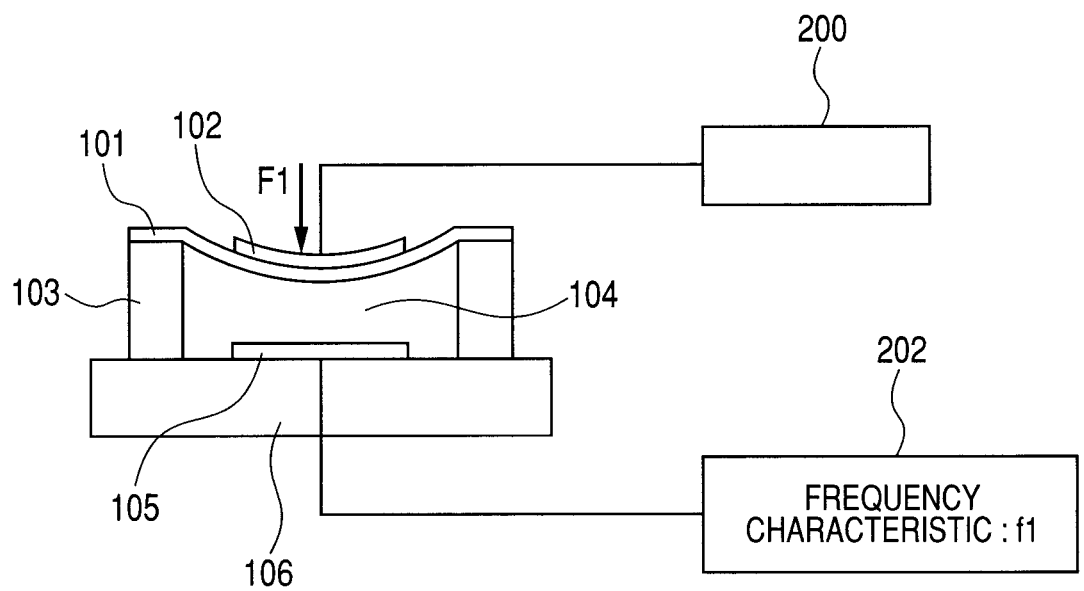
FIG. 1A illustrates a control apparatus and control method for a capacitive electromechanical transducer according to a first embodiment.

The following is a description of embodiments of the present invention. The essential point of the present invention is to adjust frequency characteristics by changing a parameter that defines the frequency domain to be used in transmitting/receiving operations, corresponding to a change in the frequency characteristics to which a second electrode or a diaphragm responds. Here, the frequency characteristics are adjusted by changing the external stress or the external force to be applied to the second electrode or the diaphragm. The frequency characteristics to which the second electrode or the diaphragm responds are typically the frequency distribution of displacement of the second electrode or the diaphragm per unit input pressure. The frequency characteristics related to the parameter that defines the frequency domain to be used in transmitting/receiving operations are the characteristics related to the parameter indicating the frequency distribution of the principal components contained in a driving signal in a transmitting operation (a driving operation). In a receiving operation (a detecting operation), the frequency characteristics related to the parameters that define the frequency domain to be used in transmitting and receiving operations are typically the characteristics related to the parameters indicating the frequency distribution of the conversion gain of the output with respect to an input current. Further, the term "corresponding to" typically implies that the frequency domains between the cutoff frequency on the low frequency side and the cutoff frequency on the high frequency side in respective frequency distributions are substantially the same or sufficiently overlap with each other.

Based on this concept, a control apparatus for a capacitive electromechanical transducer according to the present invention has the following features. That is, the apparatus is a control apparatus for a capacitive electromechanical transducer that has cells each including first and second electrodes that face each other, with a gap being interposed in between, which apparatus includes a driving/detecting unit and an external stress applying unit. The driving/detecting unit performs at least one of a driving operation to cause the second electrode to vibrate and transmit elastic waves by generating an AC electrostatic attractive force between the first and second electrodes, and a detecting operation to detect a change of capacitance between the first and second electrodes, the change of capacitance being caused by the second electrode vibrating upon receipt of elastic waves. The external stress applying unit changes the external stress to be applied to the second electrode. Further, the driving/detecting unit adjusts frequency characteristics by changing a parameter that defines the frequency domain to be used in a transmitting/receiving operation, corresponding to the change of the external stress.

Also, based on this concept, a method of controlling a capacitive electromechanical transducer according to the present invention has the following features. That is, the method is a method of controlling a capacitive electromechanical transducer that has cells each including first and second electrodes that face each other, with a gap being interposed in between, which method includes first through third steps. In the first step, at least one of the following two operations is performed: a driving operation to cause the second electrode to vibrate and transmit elastic waves by generating an AC electrostatic attractive force between the first and second electrodes, and a detecting operation to detect a change of capacitance between the first and second electrodes, the change of capacitance being caused by the second electrode vibrating upon receipt of elastic waves. In the second step, the external stress to be applied to the second electrode is changed, so as to change the frequency characteristics to which the second electrode responds. In the third step, the frequency characteristics are adjusted by changing a parameter that defines the frequency domain to be used in a transmitting/receiving operation, corresponding to the change of the external stress. In this manner, the frequency characteristics in operations to transmit/receive elastic waves in the capacitive electromechanical transducer, or the transmission/reception bands, are changed.

Based on the above basic forms, the embodiments described below can be realized. For example, a cell that has a set including two electrodes facing each other with a gap being interposed in between may include a diaphragm having a second electrode formed thereon, a supporting portion supporting the diaphragm, and a first electrode placed in a position facing the second electrode via the gap (see the later described first and other embodiments). The second electrode is the later described upper electrode, and the first electrode is the later described lower electrode. The external stress applying unit changes the external stress, so as to switch the condition between a non-contact condition in which the second electrode or the diaphragm is not in contact with the first electrode, and a contact condition in which the second electrode or the diaphragm is in contact with the first electrode (see the later described first and other embodiments). The driving/detecting unit switches the frequency characteristics to a first state when the external stress applying unit changes the external stress in such a manner as to realize a contact condition. The driving/detecting unit switches the frequency characteristics to a second state when the external stress applying unit changes the external stress in such a manner as to realize a non-contact state. In the first state, the entire frequency domain to be used is located on the higher frequency side than in the second state (see the later described first and other embodiments).

The center frequency that is the frequency substantially at the midpoint between the cutoff frequency on the low frequency side and the cutoff frequency on the high frequency side of the frequency characteristics in the first state of the driving/detecting unit can be made almost twice as high as the center frequency of the frequency characteristics in the second state. Also, the external stress applying unit can be designed to change the external stress by changing the electrostatic attractive force generated by the potential difference between the first electrode and the second electrode (see the later described second embodiment).

The driving/detecting unit can be designed to include a current detecting unit containing a transimpedance circuit that performs a detecting operation. The driving/detecting unit adjusts the frequency characteristics of the detection operation by changing the parameter of the feedback portion of the transimpedance circuit (see the later described fourth embodiment). The driving/detecting unit can also be designed to include drivers/detectors with different frequency characteristics from one another, and switch drivers/detectors to be operated among the drivers/detectors, corresponding to the change of the external stress caused by the external stress applying unit (see the later described fifth embodiment).

The structure may also include an interconnect switching unit that changes the number of first electrodes (or the number of cells) to be connected to a single driving/detecting unit, in connection to the external stress applying unit switching the condition between a contact condition and a non-contact condition. In this case, the driving/detecting unit and the second electrode can be connected to each other in a way that the number of first electrodes to be connected to the single driving/detecting unit is smaller in the contact condition than in the non-contact condition (see the later described sixth embodiment). More than one driving/detecting unit may be provided, and the interconnect switching unit can maintain the same number of driving/detecting units, to which first electrodes (cells) are connected, as the number of input/output signals held by the capacitive electromechanical transducer (see the later described seventh embodiment). By performing such interconnect switching, the device pitch can be changed, and an interconnect form corresponding to the frequency band to be used can be obtained. For example, where the device pitch needs to be made narrower as the frequency becomes higher, the interconnect form can be changed to cope with the narrower device pitch.

The following is a detailed description of embodiments of control apparatuses for electromechanical transducers and methods of controlling electromechanical transducers according to the present invention, with reference to the accompanying drawings.

(First Embodiment)

Figure 1B:
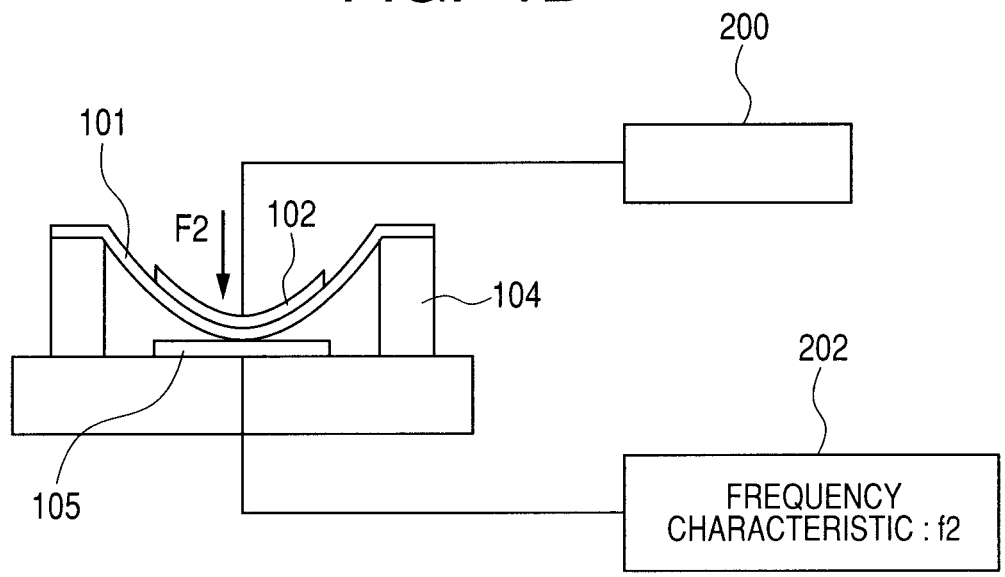
FIG. 1B illustrates a control apparatus and control method for a capacitive electromechanical transducer according to a first embodiment.

FIGS. 1A and 1B are cross-sectional views illustrating a first embodiment that includes a diaphragm 101, an upper electrode 102 that is a second electrode, a supporting portion 103, a gap 104, a lower electrode 105 that is a first electrode, a substrate 106, an external stress applying unit 200, and a driving/detecting unit 202. The diaphragm 101 having the upper electrode 102 formed thereon is supported by the supporting portion 103 formed on the substrate 106, and vibrates together with the upper electrode 102. The lower electrode 105 is formed at a location on the substrate 106, with the location facing the upper electrode 102 on the diaphragm 101 via the gap 104. In this embodiment, the diaphragm 101 and the supporting portion 103 are made of materials having electrical insulating properties. To cause the apparatus to transmit/receive elastic waves such as ultrasound, the upper electrode 102 and the lower electrode 105 are connected to the driving/detecting unit 202. The external stress applying unit 200 and the driving/detecting unit 202 constitute a controller. The controller drives the device components 101 through 105 of the electromechanical transducer (hereinafter described as a CMUT) formed on the substrate 106, and detects signals from the device components 101 through 105.

In this embodiment, a cell has a structure that includes the upper electrode 102 and the lower electrode 105 that face each other, with the gap 104 being interposed in between. Normally, a CMUT that is a transducer array includes about 200 to 4000 devices, with each device including a number of cells (normally about 100 to 3000 cells). The size of the apparatus is several millimeters to several centimeters. Here, each one device is a region of the minimum size to perform driving (transmission) and detecting (reception) when ultrasound is transmitted/received. Each device has a structure in which one or more cells are electrically connected in parallel. The number of cells, the arrangement of the cells, and the shape of each gap in each device are arbitrarily set, as long as an electromechanical transduction function can be achieved. The arrangement and number of devices may also be set as needed. The upper electrode may also serve as a diaphragm. In that case, however, a layer made of a material having electrical insulating properties needs to be provided between the upper electrode and the lower electrode. For example, an insulating layer needs to be formed on the lower electrode.

The CMUT of this embodiment changes the reference position (a condition that is not affected in a transmitting or receiving operation) of the diaphragm 101, so as to change the frequency band for transmission/reception. More specifically, the condition is switched between a non-contact condition in which the lower portion of the diaphragm 101 is not in contact with the lower electrode 105 as shown in FIG. 1A, and a contact condition in which the lower portion of the diaphragm 101 is in contact with the lower electrode 105 as shown in FIG. 1B. The non-contact condition illustrated in FIG. 1A is the above mentioned conventional mode. The contact condition illustrated in FIG. 1B is the above mentioned collapse mode. Here, the frequency domain to which the diaphragm 101 responds has a high correlation with the resonance frequency of the diaphragm 101. Typically, the resonance frequency of the diaphragm 101 in the conventional mode is almost twice as high as the resonance frequency of the diaphragm 101 in the collapse mode. For example, where the resonance frequency of the diaphragm 101 in the conventional mode is approximately 5 MHz, the resonance frequency of the diaphragm 101 in the collapse mode is approximately 10 MHz. Accordingly, by switching the condition of the same structure between the conventional mode and the collapse mode, the diaphragm 101 can be caused to respond to different frequency domains. In other words, the frequency characteristics can be changed.

The switching between the conventional mode and the collapse mode can be performed by changing the external stress to be applied to the diaphragm 101 in the direction toward the lower electrode 105. Specifically, the external stress applying unit 200 applies an external stress to the diaphragm 101 in the direction toward the lower electrode 105. The external stress applying unit 200 can be realized by using an electrostatic attractive force, an electromagnetic force, a pressure, a piezoelectric effect, or the like. The case where an electrostatic attractive force is used will be described later. In the case where an electromagnetic force is used, a magnetic material is placed on the diaphragm 101, and an external stress is applied to the diaphragm 101 with a coil that is placed at an appropriate location on a fixed portion (on the supporting portion 103 or on the substrate 106, for example). In the case where a pressure is used, the inner pressure in the gap 103 below the diaphragm 101 is changed by the external stress applying unit 200 as a pressure adjusting unit, and the external stress to be applied to the diaphragm 101 is changed with the difference between the inner pressure in the gap 103 and the atmospheric pressure applied onto the surface of the diaphragm 101. In the case where a piezoelectric effect is used, a piezoelectric device is placed near the diaphragm 101 or the supporting portion 103, and the voltage to be applied to the piezoelectric device is changed, so as to change the external stress to be applied to the diaphragm 101.

When the external stress applied to the diaphragm 101 becomes greater than the recovery force of the diaphragm 101 that acts in the opposite direction from the lower electrode 105 by virtue of the spring component of the diaphragm 101, the diaphragm 101 is deformed and is brought into contact with the lower electrode 105. On the other hand, by reducing the external stress, the diaphragm 101 is separated from the lower electrode 105. By taking advantage of this phenomenon, the diaphragm 101 can be switched between the conventional mode and the collapse mode. To enable this switching operation, the diaphragm 101 needs to be not too hard. For example, the voltage to be applied to cause the diaphragm 101 to collapse with the use of the later described electrostatic attractive force needs to be lower than the withstand voltage of the device.

In this embodiment, the force applied to the diaphragm 101 in the direction toward the lower electrode 105 is switched between F1 and F2, and the condition is also switched between the conventional mode and the collapse mode. In this manner, the frequency characteristics (the resonance frequency) to which the diaphragm 101 responds are changed. Furthermore, the driving/detecting unit 202 is designed to be capable of changing the frequency distribution of the components of the driving signal supplied to the CMUT at the time of transmission of ultrasound, and the frequency characteristics in detecting a change of capacitance of the EMUT at the time of reception of ultrasound. The sizes of the external stresses F1 and F2 show a relationship expressed as F1<F2. The center frequencies f1 and f2 of the frequency characteristics show a relationship expressed as f1<f2. Also, the magnitude of the driving signal of the driving/detecting unit 202 or the gain of the detecting circuit may be adjusted corresponding to the characteristics of the conventional mode and the collapse mode.

As described above, the frequency characteristics (the resonance frequency) to which the diaphragm 101 of the CMUT responds are changed, and the frequency characteristics in a driving signal or in detecting a change of capacitance required by the CMUT to perform transmission/reception are changed corresponding to the above changed frequency characteristics. Accordingly, transmission and reception characteristics with different frequency ranges can be realized with the single CMUT. Since the transmission/reception characteristics can be realized with the single CMUT, there is no need to prepare more than one structure, and devices can be arranged more efficiently than in a case where two or more structures are required in terms of the same transducer area. Accordingly, high-power transmission and highly-sensitive reception can be realized in a limited transducer area, without a decrease in transmission/reception efficiency.

Also, by using the CMUT control apparatus and method according to this embodiment, different measuring objects can be measured with one transducer with high sensitivity. Also, one CMUT may be used in different measuring methods. For example, the same measuring object can be more accurately measured by using different frequencies. Furthermore, since measurement can be carried out with the same CMUT at two different frequencies, two measurement results can be accurately obtained, without a change in the positional relationship with respect to the measuring object.

(Second Embodiment)

Figure 2A:
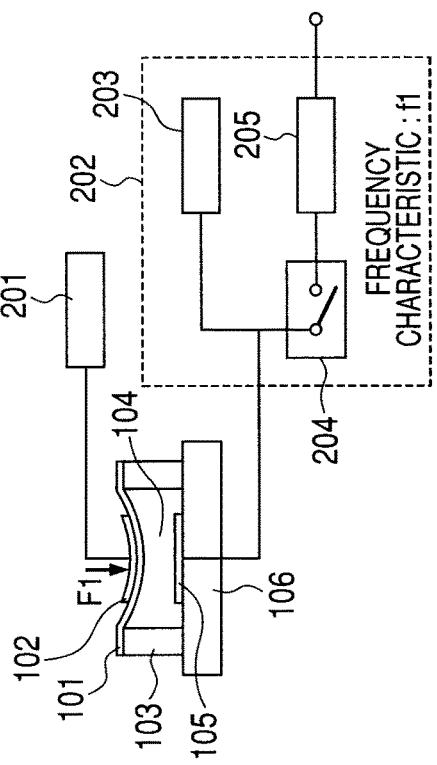
FIG. 2A illustrates a control apparatus and control method for a capacitive electromechanical transducer according to a second embodiment.
Figure 2C:
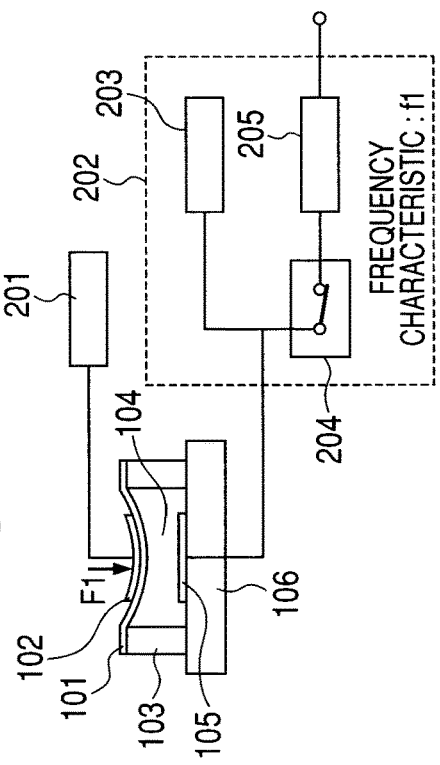
FIG. 2C illustrates a control apparatus and control method for a capacitive electromechanical transducer according to a third embodiment.
Figure 2B:
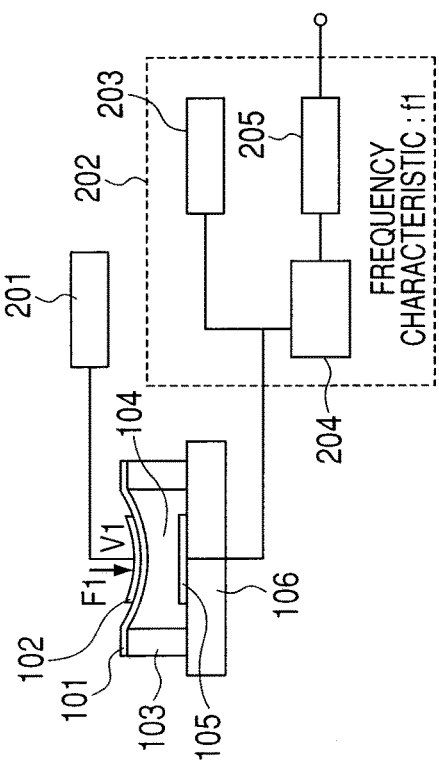
FIG. 2B illustrates a control apparatus and control method for a capacitive electromechanical transducer according to a second embodiment.

Referring now to FIGS. 2A and 2B, a second embodiment is described. The second embodiment concerns a specific example of a mechanism that applies a force to the diaphragm 101 in the direction toward the lower electrode 105. Other than that, this embodiment is substantially the same as the first embodiment. In this embodiment, the force to be applied to the diaphragm 101 by the external stress applying unit in the direction toward the lower electrode 105 is the electrostatic attractive force generated by the potential difference between the upper and lower electrodes 102 and 105. FIGS. 2A and 2B illustrate this embodiment that includes a DC potential applying unit 201 that is an external stress applying unit, an AC potential generating unit 203 that is a driving unit, a protection switch 204, and a current detecting unit 205 that is a detecting unit. The driving/detecting unit 202 includes the AC potential generating unit 202, the protection switch 204, and the current detecting unit 205.

All the upper electrodes 102 in the CMUT are electrically connected, and are connected to the DC potential applying unit 201. The DC potential applying unit 201 applies a desired potential between the upper and lower electrodes to each upper electrode 102, to cause a potential difference from the potential of each corresponding lower electrode 105. In this manner, an electrostatic attractive force is generated between the upper electrode 102 and the lower electrode 105. This electrostatic attractive force is determined by the distance and potential difference between the upper and lower electrodes 102 and 105, and the force to be applied to the diaphragm 101 can be accurately controlled.

The driving/detecting unit 202 is also connected to each lower electrode 105. To transmit/receive ultrasound, the driving/detecting unit 202 includes a driving unit that drives the CMUT, and a detecting unit that detects a change of capacitance in the CMUT. The lower electrode 105 is fixed to a certain potential by the driving/detecting unit 202 when ultrasound is not transmitted.

In this embodiment, the switching between the conventional mode and the collapse mode is performed by changing the potential difference between the upper electrode 102 and the lower electrode 105. When the force that pulls the diaphragm 101 exceeds a certain value due to the control over the electrostatic attractive force generated by the potential difference between the upper and lower electrodes, the diaphragm 101 is instantly pulled toward the lower electrode 105. This phenomenon is called a pull-in. This depends on the magnitude relation between the force (the force generated by combining the electrostatic attractive force, the force generated by the difference between the pressure in the gap 104 and the atmospheric pressure, and the like) that pulls the diaphragm 101 toward the lower electrode 105, and the recovery force that returns the diaphragm 101 in the opposite direction from the lower electrode 105 by virtue of the spring component of the diaphragm 101.

In this embodiment, different potential differences V1 and V2 are applied between the upper and lower electrodes 102 and 105, to switch the condition between the conventional mode (the condition illustrated in FIG. 2A) and the collapse mode (the condition illustrated in FIG. 2B), and change the frequency characteristics to which the diaphragm 101 responds. In this manner, the forces F1 and F2 to be applied to the diaphragm 101 can be generated by a simple mechanism. Also, simply by changing the potential to be applied to the upper electrode 102, the magnitude of the force to be applied to the diaphragm 101 can be accurately changed. Accordingly, the operation modes of the diaphragm 101 can be switched more certainly.

(Third Embodiment)

Figure 2D:
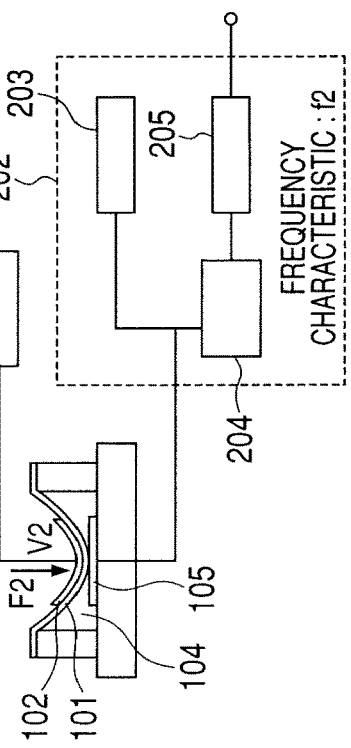
FIG. 2D illustrate a control apparatus and control method for a capacitive electromechanical transducer according to a third embodiment.

Referring now to FIGS. 2C and 2D, a third embodiment is described. The third embodiment concerns a specific structure of the driving/detecting unit 202 of the CMUT. Other than that, this embodiment is substantially the same as the second embodiment. In the driving/detecting unit 202 of this embodiment, the center frequency of the frequency distribution of the components of the driving signal supplied to the CMUT at the time of transmission of ultrasound, and the center frequency of the frequency characteristics in detecting a change of capacitance of the CMUT at the time of reception are made about twice as high or low as each other, depending on the operation mode of the diaphragm 101. Here, the center frequency of the driving signal is the frequency of the frequency component with the largest amplitude among the frequency components contained in the driving signal. The center frequency of the frequency characteristics in detecting is the frequency almost at the midpoint between the cutoff frequency on the low detection frequency characteristics side and the cutoff frequency on the high detection frequency characteristics side.

The operations to be performed by the driving/detecting unit 202 to transmit ultrasound and receive ultrasound are now sequentially described. At the time of transmission of ultrasound, the AC potential generating unit 203 connected to the lower electrode 105 applies an AC potential to the lower electrode 105. As a result, an AC potential difference is generated between the upper electrode 102 and the lower electrode 105, and an AC electrostatic attractive force is generated in the diaphragm 101. At this point, the protection switch 204 connected to the lower electrode 105 is switched off, to protect the input unit of the current detecting unit 205 from the potential generated from the AC potential generating unit 203. The diaphragm 101 vibrates due to the electrostatic attractive force generated in this manner, and the CMUT transmits ultrasound.

The AC potential generating unit 203 can generate driving signals having different frequency components, depending on the switching of the diaphragm 101 between the conventional mode and the collapse mode. The center frequencies of the driving signals that can be generated can be made about twice as high or low as each other, corresponding to the response frequencies in the conventional operation and the collapse operation of the diaphragm 101. For example, the center frequency of the driving signal in the collapse operation may be twice as high as the center frequency of the driving signal in the conventional operation. The AC potential generating unit 203 can be formed with the use of a voltage control oscillator or the like. The driving signals are formed by some cycles of sine waves or square waves (some repetitive cycles of waveforms, instead of sequential waveforms), or monopulse waves, for example.

On the other hand, at the time of reception of ultrasound, the AC potential generating unit 203 is put into a high impedance condition, and does not affect the potential of the lower electrode 105 (the condition illustrated in FIG. 2D). Putting the terminal into an open condition is the simplest way to realize the high impedance condition. In practice, the switches connected to the terminal are all turned off to create the high impedance condition. Meanwhile, the protection switch 204 is turned on, and the lower electrode 105 and the input unit of the current detecting unit 205 are connected to each other. At this point, if the diaphragm 101 vibrates due to the ultrasound applied from outside, a change of capacitance is caused between the upper and lower electrodes 102 and 105. Since the upper electrode 102 is fixed at a certain potential (which varies depending on whether the operation mode is the conventional mode or the collapse mode), a very small amount of current flows through the interconnect of the lower electrode 105 due to the inductive charge generated in the lower electrode 105. As the current detecting unit 205 detects the very small change in current, the magnitude of the ultrasound that has caused the change of capacitance can be detected. At this point, the potential of the lower electrode 105 is fixed at a certain potential by the driving/detecting unit 202.

The current detecting unit 205 can change the frequency characteristics for performing current detection, corresponding to the switching of the diaphragm 101 between the conventional mode and the collapse mode. The frequency characteristics of the current detecting unit 205 in the collapse operation are set to have a higher center frequency than (about twice as high as) the center frequency of the frequency characteristics in the conventional operation. In other words, even when the operation mode is switched between the conventional mode and the collapse mode, and the frequency to which the diaphragm 101 responds upon receipt of ultrasound becomes almost twice as high, the current detecting unit 205 can detect the current, based on the frequency.

According to this embodiment, between the conventional mode and the collapse mode, the form of change in the center frequency of the frequency characteristics of the driving/detecting unit 202 at the time of transmission/reception can be made substantially equal to the form of change in the center frequency of the diaphragm 101. Accordingly, optimum frequency characteristics can be obtained in the entire CMUT in both the conventional mode and the collapse mode that are switched on the time axis.

(Fourth Embodiment)

Referring now to FIGS. 3A, 3B, 3C and 3D, a fourth embodiment is described. The fourth embodiment concerns a specific structure of the current detecting unit 205. Other than that, this embodiment is the same as one of the first through third embodiments. In this embodiment, the current detecting unit 205 that can change frequency characteristics is formed by a transimpedance circuit that is a current-voltage converting circuit that converts a change in a very small amount of current into a voltage.

FIGS. 3A, 3B, 3C, and 3D illustrate transimpedance circuits each as the current detecting unit 205 of this embodiment that includes an operational amplifier 301, resistors 302, 304, and 306, capacitors 303, 305, and 307, and a circuit device switching unit 308. The transimpedance circuits also include a variable resistor 309, a variable capacitor 310, and a high-speed switch 311. In FIGS. 3A, 3B, 3C and 3D, the operational amplifier 301 is connected to positive and negative power supplies VDD and VSS.

Figure 3A:
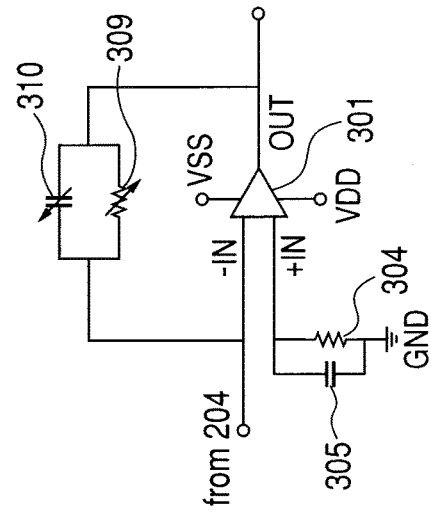
FIG. 3A illustrates the current detecting unit in a control apparatus and control method for a capacitive electromechanical transducer according to a fourth embodiment.

First, a case where the diaphragm 101 is operating in the conventional mode illustrated in FIG. 3A is described. In FIG. 3A, the inverting input terminal (−IN) of the operational amplifier 301 is connected to the lower electrode 105 of the CMUT via the protection switch 204. As for the output terminal (OUT) of the operational amplifier 301, the resistor 302 and the capacitor 303 connected in parallel to each other are connected to the inverting input terminal (−IN) by the circuit device switching unit 308, and its output signal is fed back to the operational amplifier 301. The non-inverting input terminal (+IN) of the operational amplifier 301 is connected to a ground terminal (GND) by the resistor 304 and the capacitor 305 connected in parallel to each other. The voltage of the ground terminal (GND) is an intermediate potential between the positive power supply VDD and the negative power supply VSS. The values of the resistor 302 and the resistor 304 are the same values, and the values of the capacitor 303 and the capacitor 305 are the same values. Those values serve as parameters that match the frequency characteristics of the diaphragm 101 in the conventional operation.

Figure 3B:
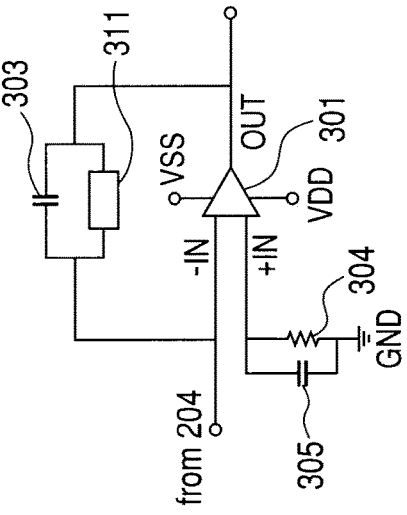
FIG. 3B illustrates the current detecting unit in a control apparatus and control method for a capacitive electromechanical transducer according to a fourth embodiment.

When the diaphragm 101 operates in the collapse mode illustrated in FIG. 3B, the circuit device switching unit 308 is switched to a structure in which feedback to the operational amplifier 301 is performed by the resistor 306 and the capacitor 307 connected in parallel to each other. This resistor 306 and the capacitor 307 serve as parameters that match the frequency characteristics of the diaphragm 101 in the collapse operation. By using the circuit device switching unit 308 in the above described manner, the frequency characteristics of current-voltage conversions of the transimpedance circuit can be switched.

Figure 3C:
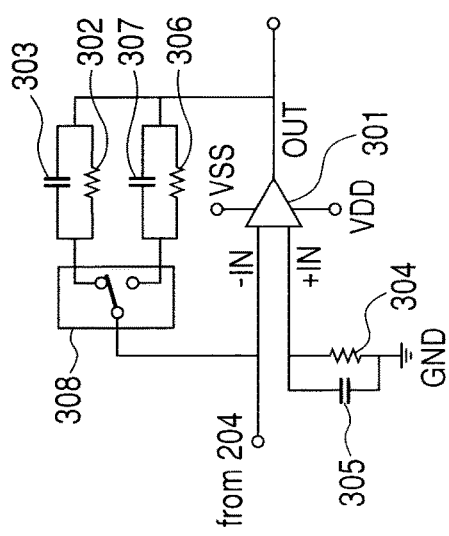
FIG. 3C illustrates the current detecting unit in a control apparatus and control method for a capacitive electromechanical transducer according to a fourth embodiment.

Referring now to FIG. 3C, another circuit structure of the current detecting unit 205 that can change frequency characteristics is described. In FIG. 3C, the circuit device switching unit 308 shown in FIG. 3A and FIG. 3B is not provided, and the variable resistor 309 in place of the resistor 302, and the variable capacitor 310 in place of the capacitor 303 are connected to the inverting input terminal (−IN). The values of the variable resistor 309 and the variable capacitor 310 are changed, so that the frequency characteristics of current-voltage conversions of the transimpedance circuit illustrated in FIG. 3C can be changed to optimal characteristics corresponding to the mode switching.

Figure 3D:
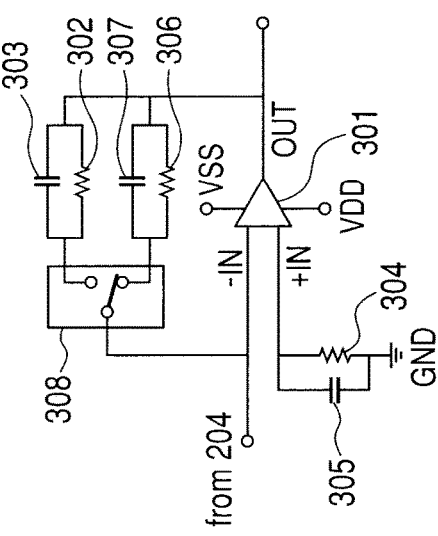
FIG. 3D illustrates the current detecting unit in a control apparatus and control method for a capacitive electromechanical transducer according to a fourth embodiment.

Referring now to FIG. 3D, yet another circuit structure is described. In FIG. 3D, the variable resistor 309 and the variable capacitor 310 illustrated in FIG. 3C are not provided. Instead, the high-speed switch 311 and the capacitor 303 are inserted. The high-speed switch 311 can be switched on and off at high speed, and the parameter of the feedback portion of the operational amplifier 301 can be changed depending on the duty ratio at which the switch is switched on and off. By changing the duty ratio of the high-speed switch 311 in the above manner, the frequency characteristics of current-voltage conversions of the transimpedance circuit illustrated in FIG. 3D can be readily changed corresponding to the mode switching.

In this embodiment, the frequency characteristics of the current detecting unit 205 can be changed with a simple circuit structure corresponding to the mode switching. In each of the examples illustrated in FIGS. 3A, 3B, 3C and 3D, only the circuit device of the feedback portion of the operational amplifier 301 is changed. However, while the circuit device of the feedback portion of the operational amplifier 301 is changed, the device structure between the non-inverting input terminal (+IN) and the ground terminal of the operational amplifier 301 may be made the same as above, so that the device constant can be switched depending on the mode of the diaphragm 101.

(Fifth Embodiment)

Figure 4A:
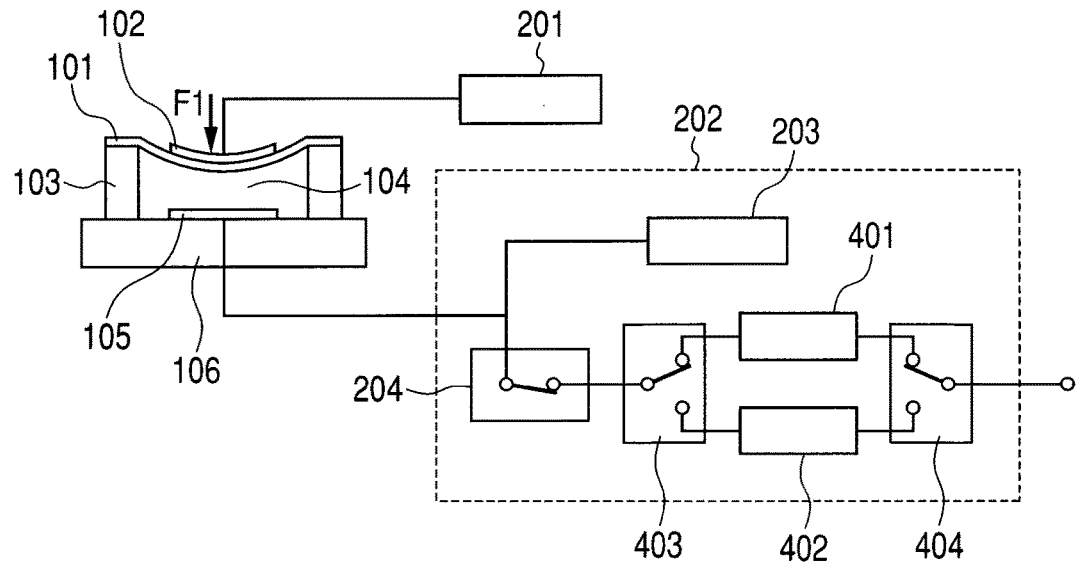
FIG. 4A illustrates the current detecting unit in a control apparatus and control method for a capacitive electromechanical transducer according to a fifth embodiment.
Figure 4B:
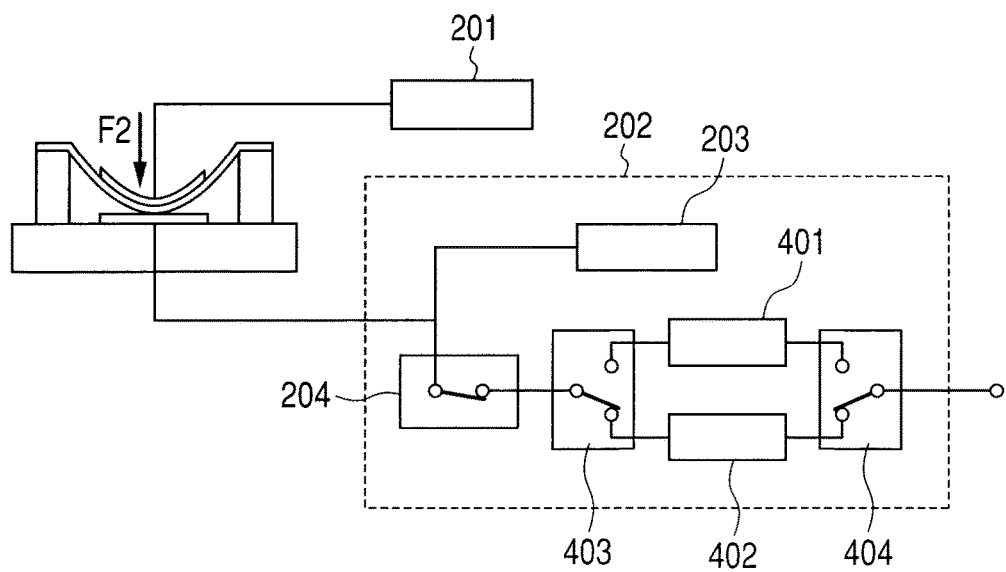
FIG. 4B illustrates the current detecting unit in a control apparatus and control method for a capacitive electromechanical transducer according to a fifth embodiment.

Referring now to FIGS. 4A and 4B, a fifth embodiment is described. The fifth embodiment concerns a specific example of the current detecting unit of the driving/detecting unit 202. Other than that, this embodiment is the same as one of the first through third embodiments. This embodiment characteristically includes current detectors having different frequency characteristics from one another.

FIGS. 4A and 4B illustrate the structure of a current detecting unit of this embodiment that includes a first current detector 401, a second current detector 402, and interconnect switching units 403 and 404. Those components constitute the current detecting unit. In this current detecting unit, an interconnect is switched to the input terminal of the first current detector 401 or the second current detector 402 by the interconnect switching unit 403. Also, one of the outputs of the first current detector 401 and the second current detector 402 has an interconnect to be switched to the output terminal of the current detecting unit by the interconnect switching unit 404. In a case where the interconnect switching unit 403 is connected to the input side of the first current detector 401, the interconnect switching unit 404 is connected to the output side of the first current detector 401 (the condition illustrated in FIG. 4A). In a case where one of the input terminal and the output terminal is connected to the second current detector 402, the other one of the input terminal and the output terminal is also connected to the second current detector 402 (the condition illustrated in FIG. 4B).

The first current detector 401 has first frequency characteristics, and the second current detector 402 has second frequency characteristics. The first frequency characteristics are set corresponding to the frequency domain to which the diaphragm 101 has sensitivity when operating in the conventional mode. The second frequency characteristics are set corresponding to the frequency domain to which the diaphragm 101 has sensitivity when operating in the collapse mode. The center frequency of the first frequency characteristics is lower than the center frequency of the second frequency characteristics. Therefore, when the diaphragm 101 is operating in the conventional mode, the interconnect switching units 403 and 404 are connected in the condition illustrated in FIG. 4A. With this arrangement, the first current detector 401 set corresponding to the frequency to which the diaphragm 101 has sensitivity when operating in the conventional mode detects a change in current, and outputs the detection result from the current detecting unit. When the diaphragm 101 is operating in the collapse mode, on the other hand, the interconnect switching units 403 and 404 are connected as illustrated in FIG. 4B. With this arrangement, the second current detector 402 set corresponding to the frequency to which the diaphragm 101 has sensitivity when operating in the collapse mode detects a change in current, and outputs the detection result from the current detecting unit.

As this embodiment includes multiple current detectors, parameters of the circuit suitable for the respective operation modes can be set independently of one another, and current detection can be performed more appropriately (suitably) in the respective modes. Accordingly, current detection with higher characteristics can be performed, and higher reception characteristics can be achieved. Although a specific structure of the current detecting unit including multiple current detectors has been described in this embodiment, the structure in which components having different frequency characteristics from each other are switched depending on the operation modes may also be applied to the AC potential generating unit 203. That is, an interconnect switching unit having the same principles as above may be used for the AC potential generating unit 203.

(Sixth Embodiment)

Figure 5A:
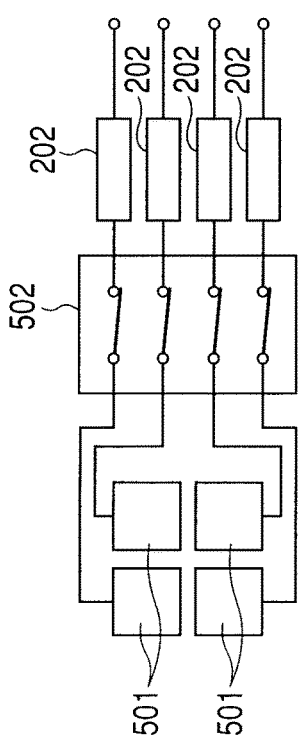
FIG. 5A illustrates a control apparatus and control method for a capacitive electromechanical transducer according to a sixth embodiment.
Figure 5B:
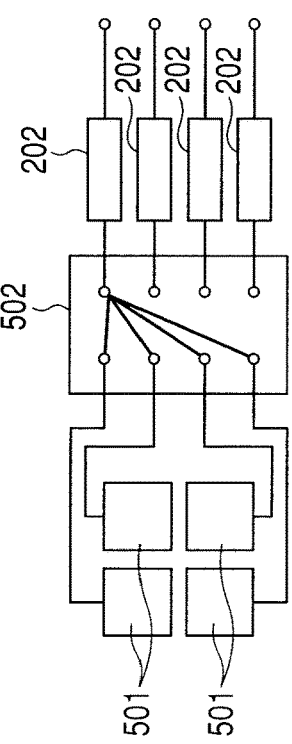
FIG. 5B illustrates a control apparatus and control method for a capacitive electromechanical transducer according to a sixth embodiment.

Referring now to FIGS. 5A and 5B, a sixth embodiment is described. The sixth embodiment concerns a specific example that changes the size of a device. Other than that, this embodiment is the same as one of the first through fifth embodiments. This embodiment characteristically changes the size of a device corresponding to an operation in the collapse mode or the conventional mode.

FIGS. 5A and 5B illustrate the CMUT of this embodiment that includes a device 501 and a device interconnect switching unit 502. Here, each device includes cells, and all the lower electrodes 105 of the cells in the same device are electrically connected. The device interconnect switching unit 502 switches the interconnect between each device 501 and the detecting/driving unit 202, depending on the operation mode of the CMUT. In an operation in the collapse mode, the lower electrodes 105 in each device 501 are connected to each corresponding driving/detecting unit 202 (the condition illustrated in FIG. 5A). Therefore, the size of each device 501 is the size of each device in the collapse mode.

In an operation in the conventional mode, on the other hand, the lower electrodes 105 of several (four in this example) devices 501 are connected to one driving/detecting unit 202 (the condition illustrated in FIG. 5B). Therefore, the total size of the several (four) devices 501 is the size of one device in the conventional mode. Here, the device pitch is narrower in the collapse mode in which the frequency band to be used is relatively high. However, the relationship in the size of each device between the collapse mode and the conventional mode may of course be reversed.

The necessary frequency varies depending on the measuring object and measurement method. Likewise, the required size of one device may vary. According to this embodiment, measurement can be carried out with the use of different frequencies and different device sizes in a single CMUT having the same structures. Accordingly, measurement more suitable for each measuring object can be carried out, and more specific information about each measuring object can be obtained.

(Seventh Embodiment)

Figure 5C:
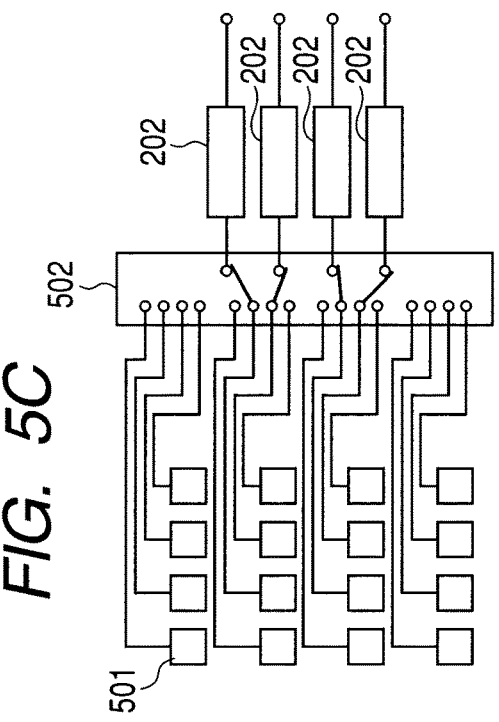
FIG. 5C illustrates a control apparatus and control method for a capacitive electromechanical transducer according to a seventh embodiment.
Figure 5D:
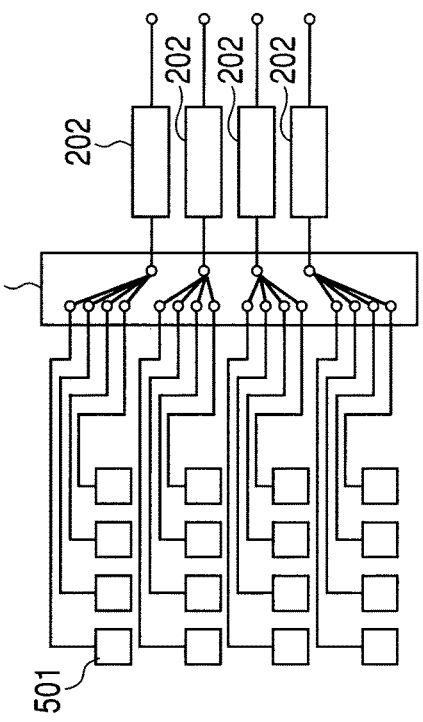
FIG. 5D illustrates a control apparatus and control method for a capacitive electromechanical transducer according to a seventh embodiment.

Referring now to FIGS. 5C and 5D, a seventh embodiment is described. The seventh embodiment concerns an example related to the number of input/output signals. Other than that, this embodiment is the same as the sixth embodiment. In this embodiment, when an operation is being performed in the collapse mode, only the same number of devices as the number of input/output signals of the transducer are connected to driving/detecting units 202.

In FIGS. 5C and 5D, the number of devices in the CMUT is represented by X, the number of devices in an operation in the collapse mode of the CMUT is represented by Z (X>Z), and the number of input/output signals from the CMUT is also Z, same as the number of the device in the collapse mode. In this example, X is 16, and Z is 4. In an operation in the collapse mode illustrated in FIG. 5C, each of the lower electrodes 105 in Z devices 501 in the center portion of the CMUT are connected to Z driving/detecting units 202 by the device interconnect switching unit 502. In this manner, Z signals are input to or output from the CMUT (the condition illustrated in FIG. 5C). On the other hand, the lower electrodes 105 in (X−Z) devices 501 are not connected to the driving/detecting units 202, and are not used for transmission/reception of ultrasound.

In an operation in the conventional mode, the lower electrodes 105 of several (four in this example) devices 501 are connected to each driving/detecting unit 202 by the device interconnect switching unit 502. There are Z driving/detecting units 202, and Z signals are input or output (the condition illustrated in FIG. 5D). In this case, all the devices 501 in the CMUT are used for transmitting/receiving ultrasound. In this manner, some devices are not used for transmission/reception in the collapse mode. Accordingly, signals that are suitable in the conventional mode and the collapse mode can be processed with the same number of output lines. In this embodiment, the relationship may similarly be reversed between the collapse mode and the conventional mode. Although the interconnects are connected to respective adjacent devices in the collapse mode in FIG. 5C, the interconnects may be connected to devices arranged at the same intervals as the device intervals in the conventional mode. Accordingly, only the frequency characteristics at the time of transmission/reception can be changed, without a change in the intervals between the devices that receive signals.

According to this embodiment, even where driving and detection are performed with different device sizes by switching the operation mode between the conventional mode and the collapse mode, the same number of input/output signals as the signal lines can be used. Accordingly, a load is not put on interconnects and a signal processing unit due to a large increase in the number of signal lines, and only necessary information can be efficiently extracted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-282278, filed Dec. 11, 2009, which is hereby incorporated by reference herein in its entirety.

The invention claimed is:

1. An apparatus comprising:
a driving/detecting unit that performs at least one of a driving operation to cause a second electrode of a capacitive transducer to vibrate and a detecting operation to detect current that flows by vibration of the second electrode, the capacitive transducer including a plurality of cells, each cell including a first electrode and the second electrode that face each other with a gap being interposed in between; and
an interconnect switching unit that changes the number of the cells to be electrically connected to one driving/detecting unit by switching connection/disconnection between the first electrode or the second electrode of a first cell and the first electrode or the second electrode of a second cell, wherein:
when the driving/detecting unit performs the driving operation, the driving/detecting unit adjusts a center frequency of a driving signal supplied to the capacitive transducer, corresponding to the number of the cells; and
when the driving/detecting unit performs the detecting operation, the driving/detecting unit adjusts a center frequency of a frequency band detected by a current detecting unit of the driving/detecting unit, corresponding to the number of the cells.

2. The apparatus according to claim 1, wherein:
the driving/detecting unit performs the detecting operation;
the current detecting unit includes a current-voltage converting circuit; and
a center frequency of the current-voltage converting circuit is adjusted, corresponding to the number of the cells.

3. The apparatus according to claim 2, wherein:
the current-voltage converting circuit includes a feedback portion; and
a parameter of the feedback portion of the current-voltage converting circuit is changed, corresponding to the number of the cells.

4. The apparatus according to claim 1, wherein:
the driving/detecting unit performs the detecting operation;
the current detecting unit includes a plurality of current detecting portions, each portion having different center frequencies; and
the plurality of current detecting portions are switched, corresponding to the number of the cells.

5. The apparatus according to claim 1, wherein the interconnect switching unit changes the number of the cells to be connected, corresponding to a center frequency to which the second electrode responds.

6. The apparatus according to claim 1, further comprising an applying unit for applying voltage between the first electrode and the second electrode.

7. The apparatus according to claim 6, wherein the applying unit changes the voltage so as to switch conditions between a non-contact condition in which the second electrode is not in contact with the first electrode side, and a contact condition in which the second electrode is in contact with the first electrode side.

8. The apparatus according to claim 7, wherein the number of cells to be connected is larger in the non-contact condition than in the contact condition.

9. An apparatus comprising:
a detecting unit to detects current that flows by vibration of a second electrode of a capacitive transducer, the capacitive transducer including a plurality of cells, each cell including a first electrode and the second electrode that face each other with a gap being interposed in between; and
an interconnect switching unit that changes the number of the cells to be electrically connected to one detecting unit by switching connection/disconnection between the first electrode or the second electrode of a first cell and the first electrode or the second electrode of a second cell,
wherein a center frequency of a frequency band detected by a current detecting unit is adjusted, corresponding to the number of the cells.

10. The apparatus according to claim 9, wherein:
the current detecting unit includes a current-voltage converting circuit; and
a center frequency of the current-voltage converting circuit is adjusted, corresponding to the number of the cells.

11. The apparatus according to claim 10, wherein:
the current-voltage converting circuit includes a feedback portion; and
a parameter of the feedback portion of the current-voltage converting circuit is changed, corresponding to the number of the cells.

12. The apparatus according to claim 9, wherein:
the current detecting unit includes a plurality of current detecting portions, each portion having different center frequencies; and
the plurality of current detecting portions are switched, corresponding to the number of the cells.

13. The apparatus according to claim 9, wherein the interconnect switching unit changes the number of the cells to be connected, corresponding to a center frequency to which the second electrode responds.

14. The apparatus according to claim 9, further comprising an applying unit for applying voltage between the first electrode and the second electrode.

15. The apparatus according to claim 14, wherein the applying unit changes the voltage so as to switch conditions between a non-contact condition in which the second electrode is not in contact with the first electrode side, and a contact condition in which the second electrode is in contact with the first electrode side.

16. The apparatus according to claim 15, wherein the number of cells to be connected is larger in the non-contact condition than in the contact condition.

17. An apparatus comprising:
a driving unit to cause a second electrode of a capacitive transducer to vibrate and input a driving signal for transmitting elastic waves, the capacitive transducer including a plurality of cells, each cell including a first electrode and the second electrode that face each other with a gap being interposed in between; and an interconnect switching unit that changes the number of the cells to be electrically connected to one driving unit by switching connection/disconnection between the first electrode or the second electrode of a first cell and the first electrode or the second electrode of a second cell, wherein center frequencies of a driving signal supplied to the capacitive transducer are adjusted, corresponding to the number of the cells.

18. The apparatus according to claim 17, wherein the interconnect switching unit changes the number of the cells to be connected, corresponding to a center frequency to which the second electrode responds.

19. The apparatus according to claim 17, further comprising an applying unit for applying voltage between the first electrode and the second electrode.

20. The apparatus according to claim 19, wherein the applying unit changes the voltage so as to switch conditions between a non-contact condition in which the second electrode is not in contact with the first electrode side, and a contact condition in which the second electrode is in contact with the first electrode side.

21. The apparatus according to claim 20, wherein the number of cells to be connected is larger in the non-contact condition than in the contact condition.

22. A method comprising:

performing at least one of a driving operation or a detecting operation by a driving/detecting unit that performs at least one of a driving operation to cause to vibrate a second electrode of a capacitive transducer that includes a plurality of cells, each cell including a first electrode and the second electrode that face each other with a gap being interposed in between, and a detecting operation to detect current that flows by vibration of the second electrode; and changing the number of the cells to be electrically connected to one driving/detecting unit by switching connection/disconnection between the first electrode or the second electrode of a first cell and the first electrode or the second electrode of a second cell, wherein:

when the driving/detecting unit performs the driving operation, the driving/detecting unit adjusts a center frequency of a driving signal supplied to the capacitive transducer, corresponding to the number of the cells; and when the driving/detecting unit performs the detecting operation, the driving/detecting unit adjusts a center frequency of a frequency band detected by a current detecting unit of the driving/detecting unit, corresponding to the number of the cells.

23. A method comprising:

detecting by a detecting unit a current that flows by vibration of a second electrode of a capacitive transducer that includes a plurality of cells, each cell including a first electrode and the second electrode that face each other with a gap being interposed in between;

changing the number of the cells to be electrically connected to one detecting unit by switching connection/disconnection between the first electrode or the second electrode of a first cell and the first electrode or the second electrode of a second cell; and adjusting a center frequency of a driving signal of the detecting unit, corresponding to the number of the cells.

24. A method comprising:

driving a driving unit for inputting a driving signal to transmit elastic waves by vibration of a second electrode of a capacitive transducer that includes a plurality of cells, each cell including a first electrode and the second electrode that face each other with a gap being interposed in between; and adjusting a center frequency of a driving signal supplied to the capacitive transducer, corresponding to the number of the cells.

* * * * *